(12) United States Patent
Lee et al.

(10) Patent No.: US 9,866,105 B2
(45) Date of Patent: Jan. 9, 2018

(54) METHOD OF CONTROLLING AN INVERTER

(71) Applicant: LSIS CO., LTD., Anyang-si, Gyeonggi-do (KR)

(72) Inventors: Hu Jin Lee, Cheonan-si (KR); Chun Suk Yang, Seongnam-si (KR)

(73) Assignee: LSIS CO., LTD., Seoul (KR)

( * ) Notice: Subject to any disclaimer, the term of this patent is extended or adjusted under 35 U.S.C. 154(b) by 39 days.

(21) Appl. No.: 14/815,640

(22) Filed: Jul. 31, 2015

(65) Prior Publication Data

US 2016/0111952 A1   Apr. 21, 2016

(30) Foreign Application Priority Data

Oct. 21, 2014  (KR) .................. 10-2014-0142649

(51) Int. Cl.
*H02P 27/04* (2016.01)
*H02M 1/32* (2007.01)
(Continued)

(52) U.S. Cl.
CPC .............. *H02M 1/32* (2013.01); *H02M 1/36* (2013.01); *H02M 5/42* (2013.01); *H02M 7/48* (2013.01); *H02P 27/06* (2013.01)

(58) Field of Classification Search
CPC ...... H02P 21/06; H02P 23/08; H02P 2207/01; H02M 5/271; H02M 7/53875
(Continued)

(56) References Cited

U.S. PATENT DOCUMENTS 5,430,636 A * 7/1995 Kachi ................ H02M 7/48
                                                        363/55
7,138,777 B2 * 11/2006 Won .................... H02P 6/34
                                                        318/400.02
(Continued)

FOREIGN PATENT DOCUMENTS

EP    1931022    6/2008
EP    2001096    12/2008
(Continued)

OTHER PUBLICATIONS

European Patent Office Application Serial No. 15179600.0, Search Report dated Mar. 23, 2016, 6 pages.

*Primary Examiner* — Rina Duda
(74) *Attorney, Agent, or Firm* — Lee, Hong, Degerman, Kang & Waimey (57) ABSTRACT

According to an embodiment, a method of controlling an inverter including a rectification unit rectifying inputted AC power to DC power, a smoothing unit smoothing the DC power, and a power conversion unit received the DC power from the smoothing unit to convert the received DC power into AC power having a predetermined size and frequency, the method includes receiving an abnormal signal of the inverter or an electric motor for driving the inverter, determining whether a DC terminal voltage of the smoothing unit is equal to or greater than a low voltage failure level when the abnormal signal is received, determining whether the power conversion unit is operating, and blocking current output of the power conversion unit when the DC terminal voltage is equal to or greater than the low voltage failure level and the power conversion unit is operating.

4 Claims, 5 Drawing Sheets

(51) Int. Cl.
  *H02P 27/06* (2006.01)
  *H02M 7/48* (2007.01)
  *H02M 1/36* (2007.01)
  *H02M 5/42* (2006.01)

(58) Field of Classification Search
  USPC .............................. 318/139, 797, 800, 801
  See application file for complete search history.

(56) References Cited

U.S. PATENT DOCUMENTS

| | | | | |
|---|---|---|---|---|
| 8,045,301 B2* | 10/2011 | Shiba | ..................... | B60L 3/003 |
| | | | | 318/800 |
| 8,154,890 B2* | 4/2012 | Yasuda | ................... | H02M 1/36 |
| | | | | 363/34 |
| 2005/0169018 A1* | 8/2005 | Hatai | ................ | H02M 7/53871 |
| | | | | 363/37 |
| 2007/0040532 A1* | 2/2007 | Bae | ..................... | H02H 7/0833 |
| | | | | 318/801 |
| 2007/0216340 A1* | 9/2007 | Iura | ........................ | H02P 27/06 |
| | | | | 318/801 |
| 2009/0309523 A1* | 12/2009 | Ikei | .......................... | H02P 3/12 |
| | | | | 318/380 |
| 2011/0026280 A1* | 2/2011 | Saruwatari | ............ | H02P 29/032 |
| | | | | 363/37 |
| 2012/0075893 A1* | 3/2012 | Higuchi | .................. | H02M 1/32 |
| | | | | 363/37 |
| 2012/0146567 A1* | 6/2012 | Iwaji | ...................... | H02P 29/02 |
| | | | | 318/504 |

FOREIGN PATENT DOCUMENTS

| | | |
|---|---|---|
| EP | 2381573 | 10/2011 |
| JP | H03212167 | 9/1991 |
| JP | 2007-139316 | 6/2007 |
| JP | 2008-148366 | 6/2008 |
| JP | 2010093996 | 4/2010 |
| JP | 2012-070573 | 4/2012 |
| KR | 1995-0007520 | 7/1995 |
| KR | 20-1995-0006595 | 8/1995 |
| KR | 10-2007-0021573 | 2/2007 |

* cited by examiner

METHOD OF CONTROLLING AN INVERTER

CROSS-REFERENCE TO RELATED APPLICATIONS

Pursuant to 35 U.S.C. §119(a), this application claims the benefit of earlier filing date and right of priority to Korean Patent Application No. 10-2014-0142649, filed on Oct. 21, 2014, the contents of which are hereby incorporated by reference herein in its entirety.

BACKGROUND

The present disclosure relates to a method of controlling an inverter.

In general, an inverter is a device for converting inputted commercial power into alternating current (AC) power having a predetermined frequency and size and applying the converted power to an electric motor to drive the electric motor.

Such an inverter has a limitation in which noise is introduced in an initial charging state or a transient state due to a sudden change in the external environment or the like, which causes a malfunction in a specific circuit.

Since the introduced noise has characteristics that differ according to the user environment and it is difficult to fundamentally prevent the introduction of noise when designing an inverter, inverters according to a related art use a method of instantly blocking current output and outputting a failure signal to a user when a protective operation signal is applied to a control unit during operating to protect an electric motor in an initial charging state or a transient state.

However, since a protective operation is performed by a method according to a related art even when the inverter does not need the protective operation, the reliability of the inverter is reduced and users experience inconvenience.

SUMMARY

Embodiments provide a method of controlling an inverter for determining a malfunction of defect detection in a transient state of an inverter to avoid a protective operation, thereby increasing the reliability of the inverter.

The object of the present invention is not limited to the aforesaid, but other objects not described herein will be clearly understood by those skilled in the art from descriptions below.

In one embodiment, a method of controlling an inverter including a rectification unit rectifying inputted AC power to DC power, a smoothing unit smoothing the DC power, and a power conversion unit received the DC power from the smoothing unit to convert the received DC power into AC power having a predetermined size and frequency, the method includes: receiving an abnormal signal of the inverter or an electric motor for driving the inverter; determining whether a DC terminal voltage of the smoothing unit is equal to or greater than a low voltage failure level when the abnormal signal is received; determining whether the power conversion unit is operating; and blocking current output of the power conversion unit when the DC terminal voltage is equal to or greater than the low voltage failure level and the power conversion unit is operating.

The method may further include outputting a signal indicating that a failure has occurred in the inverter.

The method may further include determining that the abnormal signal has been generated due to a malfunction of the inverter when the DC terminal voltage is equal to or less than the low voltage failure level.

The method may further include determining that the abnormal signal has been generated due to a malfunction of the inverter when the power conversion unit is stopped.

The abnormal signal may be one of a signal indicating an overcurrent of the smoothing unit, a signal indicating that an output of the power conversion unit is an overcurrent, a signal indicating overheating of the electric motor, a signal indicating an overload of the electric motor, and a signal indicating an overload of the inverter.

In another embodiment, a method of controlling an inverter including a rectification unit rectifying inputted AC power into DC power, a smoothing unit smoothing the DC power, and a power conversion unit receiving the DC power from the smoothing unit to convert the received DC power into AC power having a predetermined size and frequency, the method includes: receiving an abnormal signal of the inverter or an electric motor driving the inverter; determining whether an automatic driving function of the inverter is activated while power is provided to the inverter when the abnormal signal is received; determining whether the power conversion unit is operating; and blocking current output of the power conversion unit when the automatic driving function of the inverter is activated and the power conversion unit is operating.

The method may further include determining whether a DC terminal voltage of the smoothing unit is equal to or greater than a low voltage failure level when the automatic driving function of the inverter is not activated.

The blocking of the current output may include blocking current output of the power conversion unit when the automatic driving function of the inverter is activated, the DC terminal voltage is equal to or greater than the low voltage failure level, and the power conversion unit is operating.

The method may further include determining that the abnormal signal is generated due to a malfunction of the inverter when the DC terminal voltage is equal to or less than the low voltage failure level.

The method may further include determining that the abnormal signal is generated due to a malfunction of the inverter when the power conversion unit is stopped.

The abnormal signal may be one of a signal indicating an overcurrent of the smoothing unit, a signal indicating that an output of the power conversion unit is an overcurrent, a signal indicating overheating of the electric motor, a signal indicating an overload of the electric motor, and a signal indicating an overload of the inverter.

According to an embodiment, the power conversion unit of the inverter may determine a malfunction that performs the protective operation due to external noise when current is not being output to the electric motor, to increase the reliability of the protective operation of the inverter and enhance user convenience.

The details of one or more embodiments are set forth in the accompanying drawings and the description below. Other features will be apparent from the description and drawings, and from the claims.

DETAILED DESCRIPTION OF THE EMBODIMENTS

Advantages and features of the inventive concept, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by the scope of the claims. Like reference numerals refer to like elements throughout.

Hereinafter, detailed descriptions related to well-known functions or configurations will not be provided when their inclusion is deemed to unnecessarily obscure the subject matter of the present disclosure. Also, terms used in this specification are terms defined in consideration of functions according to embodiments, and thus, the terms may be changed according to the intention or usage of a user or operator. Therefore, the terms should be defined on the basis of the overall contents of this specification.

It is to be understood that the combining of the respective blocks in the accompanying diagrams and the respective steps in the flowcharts can be performed by computer program instructions. These computer program instructions can be loaded onto the processors of, for example, general-purpose computers, special-purpose computers, and other programmable data processing apparatuses. Therefore, the instructions performed by a computer or the processor of another programmable data processing apparatus generate means for executing functions described in the blocks in the diagrams or the steps in the flowcharts. The computer program instructions can be stored in a computer available memory or a computer readable recording medium of the computer or other programmable data processing apparatus in order to realize the functions in a specific manner. Therefore, the instructions stored in the computer available memory or the computer readable recording medium can manufacture products including the instruction means for performing the functions described in the blocks in the diagrams or the steps in the flowcharts. Also, the computer program instructions can be loaded onto the computer or other programmable data processing apparatus. Therefore, a series of operational steps is performed in the computer or other programmable data processing apparatus to generate a process executed by the computer, which makes it possible for the instructions driving the computer or other programmable data processing apparatus to provide steps for executing the functions described in the blocks of the diagrams or the steps of the flowcharts.

Each block or each step may indicate a portion of a module, a segment or a code including one or more executable instructions for performing a specific logical function (or functions). It should be noted that in some modifications of the present invention, the functions described in the blocks or the steps may be generated out of order. For example, two blocks or steps continuously shown can actually be performed at the same time, or they can be performed sometimes in reverse order according to the corresponding functions.

Figure 1:
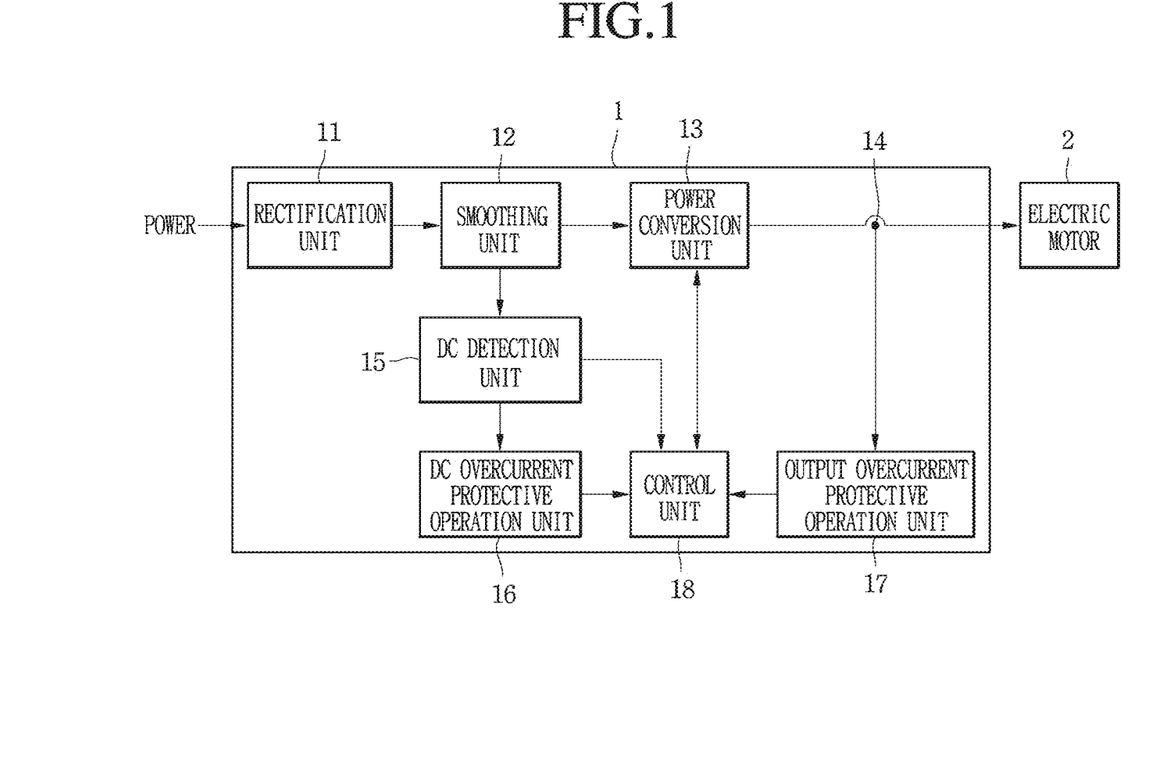
FIG. 1 is a view for describing an inverter according to an embodiment.

As illustrated in the drawings, when commercial power is received, an inverter 1 according to an embodiment converts the received power into alternating current (AC) power having a predetermined size and frequency to provide the converted AC power to an electric motor 2.

Although the inverter 1 according to an embodiment includes a rectification unit 11, a smoothing unit 12, a power conversion unit 13, an output current detection unit 14, a DC detection unit 15, a DC overcurrent protection unit 16, an output overcurrent protection unit 17, and a control unit 18 as an exemplary embodiment, the present disclosure is not limited thereto. Although a configuration for detecting and receiving a protective operation signal is disclosed in the current embodiment, the present disclosure is not limited thereto. For example, various components for detecting an abnormality in the inverter 1 and the electric motor 2 may be included. Although the control unit 18 is configured in the inverter 1 in the current embodiment, the present disclosure is not limited thereto. Those with ordinary skill in the technical field to which the present disclosure pertains will understand that controlling the inverter 1 from the outside is also possible.

The rectification unit 11 may receive external commercial power to rectify the power into direct current, and the smoothing unit 12 may smooth the direct current rectified by the rectification unit 11. For example, the smoothing unit 12 may be constituted by at least one capacitor connected in parallel. The power conversion unit 13 is constituted by a plurality of semiconductor switches to convert direct current inputted through the smoothing unit 12 into alternating current and provide the converted alternating current to the electric motor 2, according to the controlling by the control unit 18.

The output current detection unit 14 may be, e.g., a current sensor and may detect current outputted from the power conversion unit 13, and the direct current detection unit 15 may also be a current sensor that detects direct current from the smoothing unit 12.

The DC overcurrent protection unit 16 may generate a protective operation signal and provide the signal to the control unit 18 when direct current detected by the DC detection unit 15 is over an overcurrent range Also, the output overcurrent protection unit 17 may generate a protective operation signal and provide the signal to the control unit 18 when an output current detected by the output current detection unit 14 is over the overcurrent range.

Hereinafter, to differentiate the signals, a protective operation signal inputted from the DC overcurrent protection unit 16 is called "first protective operation signal", and a protective operation signal inputted from the output overcurrent protective operation unit 17 is called "second protective operation signal".

The control unit 18 controls the switching of the power conversion unit 13. Also, the control unit 18 may block current outputted to the electric motor 2 when the first or second protective operation signals are received.

Hereinafter, a protective operation of a control unit according to a related art will be described with reference to FIG. 2, and a protective operation according to an embodiment will be described with reference to FIG. 3.

Figure 2:
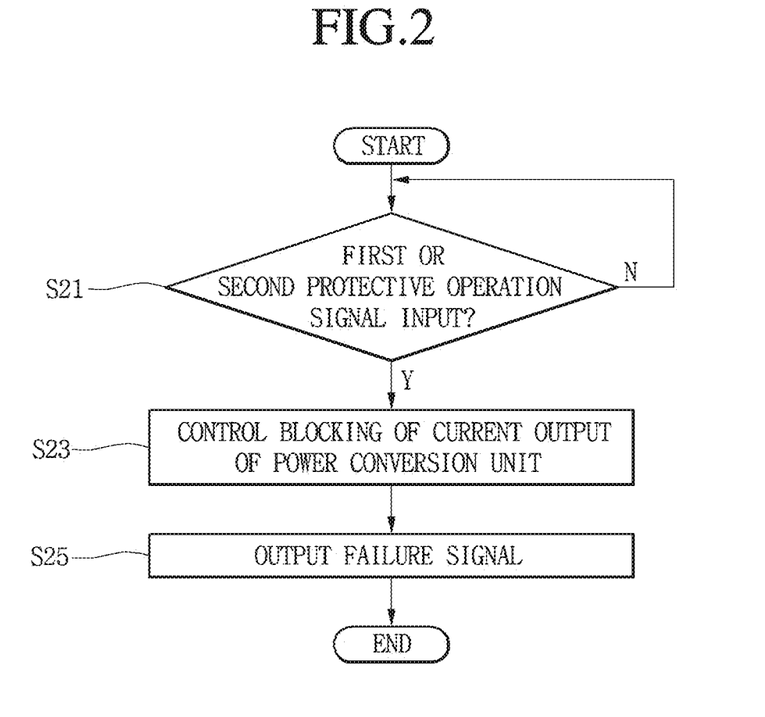
FIG. 2 is a flowchart for describing an operation for protecting an inverter performed by a control unit according to a related art.

FIG. 2 is a flowchart illustrating an operation for protecting an inverter performed by a control unit according to a related art.

As illustrated in the drawing, when the first protective operation signal is input from the DC overcurrent protective operation unit 16 or the second protective operation signal is input from the output overcurrent protective operation unit 17 (S21), the control unit 18 according to a related art may control the power conversion unit 13 to block output current from the power conversion unit 13.

Thereafter, the control unit 18 may output a failure signal (S25).

According to the controlling of an inverter according to a related art, however, when noise is introduced to the DC detection unit 16 or the output current detection unit 17 in a transient state due to an initial charging or sudden change in the external environment, the inverter according to the related art may not prevent a protective function from malfunctioning.

That is, the protective operation is performed when the inverter does not need the protective operation to resultantly reduce the reliability of the inverter and cause a user inconvenience.

To overcome this limitation, an embodiment checks the state of the inverter and then performs the protective operation to avoid a malfunction of the protective function, thereby increasing the reliability of the protective operation of the inverter.

Figure 3:
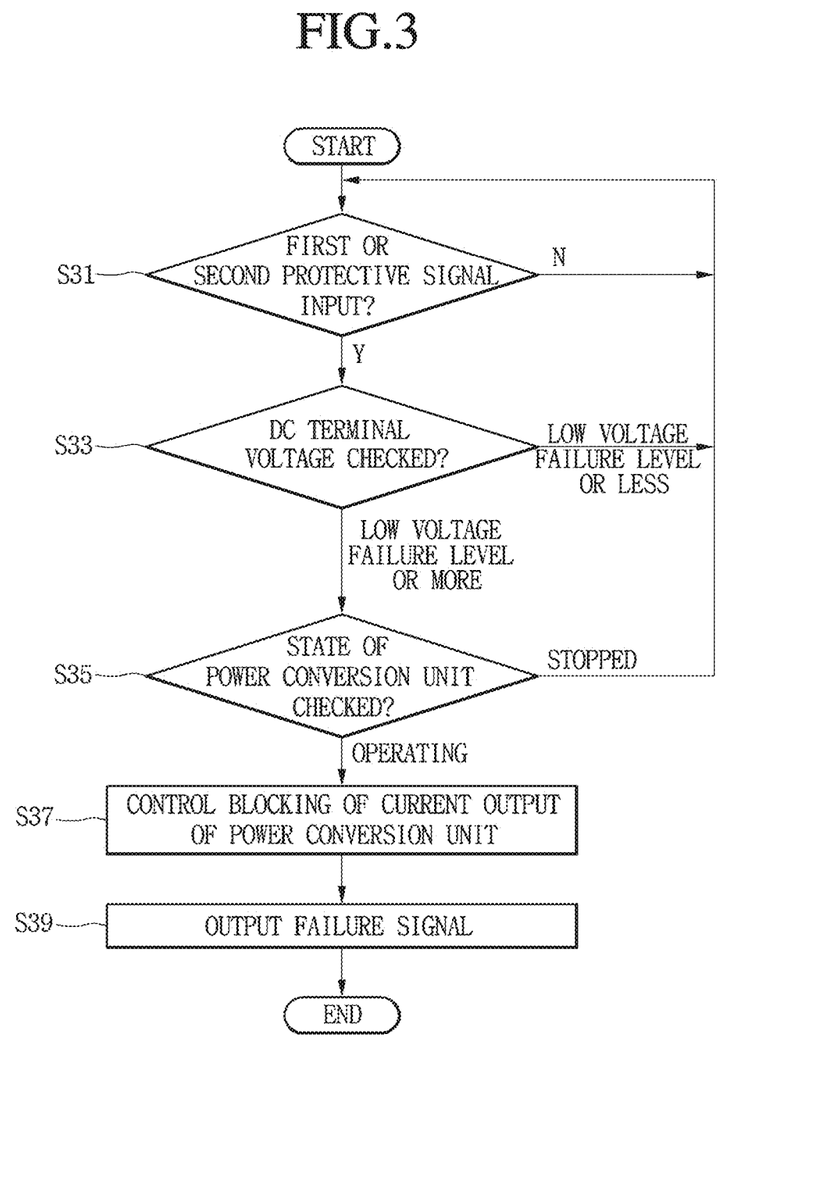
FIG. 3 is a flowchart for describing a method for controlling an inverter according to an embodiment.

FIG. 3 is a flowchart for describing a method for controlling an inverter according to an embodiment. The flowchart is provided by the control unit 18 of the inverter 1 in FIG. 1 and represents cases in which the first protective operation signal is inputted from the DC overcurrent protective operation unit 16 in a normal state of the inverter 1 or the second protective operation signal is inputted from the output overcurrent protective operation unit 17. Although the protective operation signal is generated due to an overcurrent of the inverter as described in FIG. 1, the present disclosure in not limited thereto. For example, the control unit 18 may not only receive the first protective operation signal and the second protective operation signal, but also an abnormal signal due to overheating of the electric motor 2, or an abnormal signal due to an overload of the electric motor 2. It will be apparent that an embodiment may be applied when the abnormal signal due to overloading of the inverter 1 is received.

As illustrated in the drawing, in a case in which a power is provided to the inverter 1 according to an embodiment, and then the inverter normally operates to provide alternating current having a predetermined size and frequency to the electric motor 2, when the first protective operation signal is inputted from the DC overcurrent protective operation unit 16 or the second protective operation signal is inputted from the output overcurrent protective operation unit 17 (S31), the control unit 18 according to an embodiment may check a DC terminal voltage of the smoothing unit 12 in advance (S33), unlike in the case in which an output of the power conversion unit 13 is instantly blocked and the failure signal is outputted according to a related art.

When the voltage of DC terminal is equal to or less than a low voltage failure level, because the inverter 1 is impossible to drive, the power conversion unit 13 does not output current to the electric motor 2. Accordingly, when the power conversion unit 13 does not output current to the electric motor 2, because the control unit 18 may generate an abnormal signal such as the protective operation signal while the electric motor 2 operates, the control unit 18 may determine that the abnormal signal such as the corresponding protective operation signal is generated due to a malfunction, and may not output the failure signal.

When the DC terminal voltage is equal to or greater than a low voltage failure level in operation S33, this signifies that the electric motor 2 is operating. Accordingly, the control unit 18 may check the current driving state of the inverter 1 (S35). When the inverter 1 is currently not operating and is stopped, the power conversion unit 13 of the inverter 1 may not output current to the electric motor 2 and may not generate an abnormal signal such as the protective operation signal due to the overcurrent. Accordingly, the control unit 18 may determine that the abnormal signal such as the corresponding protective operation signal is generated by a malfunction, and the failure signal may thus not be outputted.

When the inverter is operating in operation S35, because the power conversion unit 13 is outputting current, the control unit 18 may control the power conversion unit 13 according to the abnormal signal such as the inputted protective operation signal to block current output (S37) and output the failure signal (S39).

Figure 4:
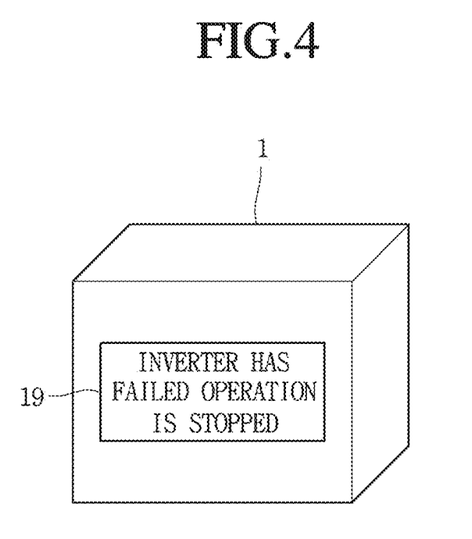
FIG. 4 is a view illustrating an example of informing a user of an outputted failure signal according to an embodiment.

FIG. 4 is a view illustrating an example of informing a user of an outputted failure signal according to an embodiment.

As illustrated in the drawing, a display unit 19 may be disposed in an external housing of the inverter 1, and the control unit 18 may display a message through the display unit 19 signifying that the inverter has failed. In this way, a message that the operation is being stopped may be made viewable to a user. The present disclosure is not limited thereto, however.

For example, the failure signal generated by the control unit 18 may be displayed through a human-machine interface (HMI) connected to the inverter 1, instead of through the display unit 19 disposed outside the inverter 1, so as to be made visibly output to a user, or may be transmitted to a user's terminal (not shown) connected through a network so as to output the failure signal of the inverter through the user's terminal so that a user may read the signal.

Figure 5:
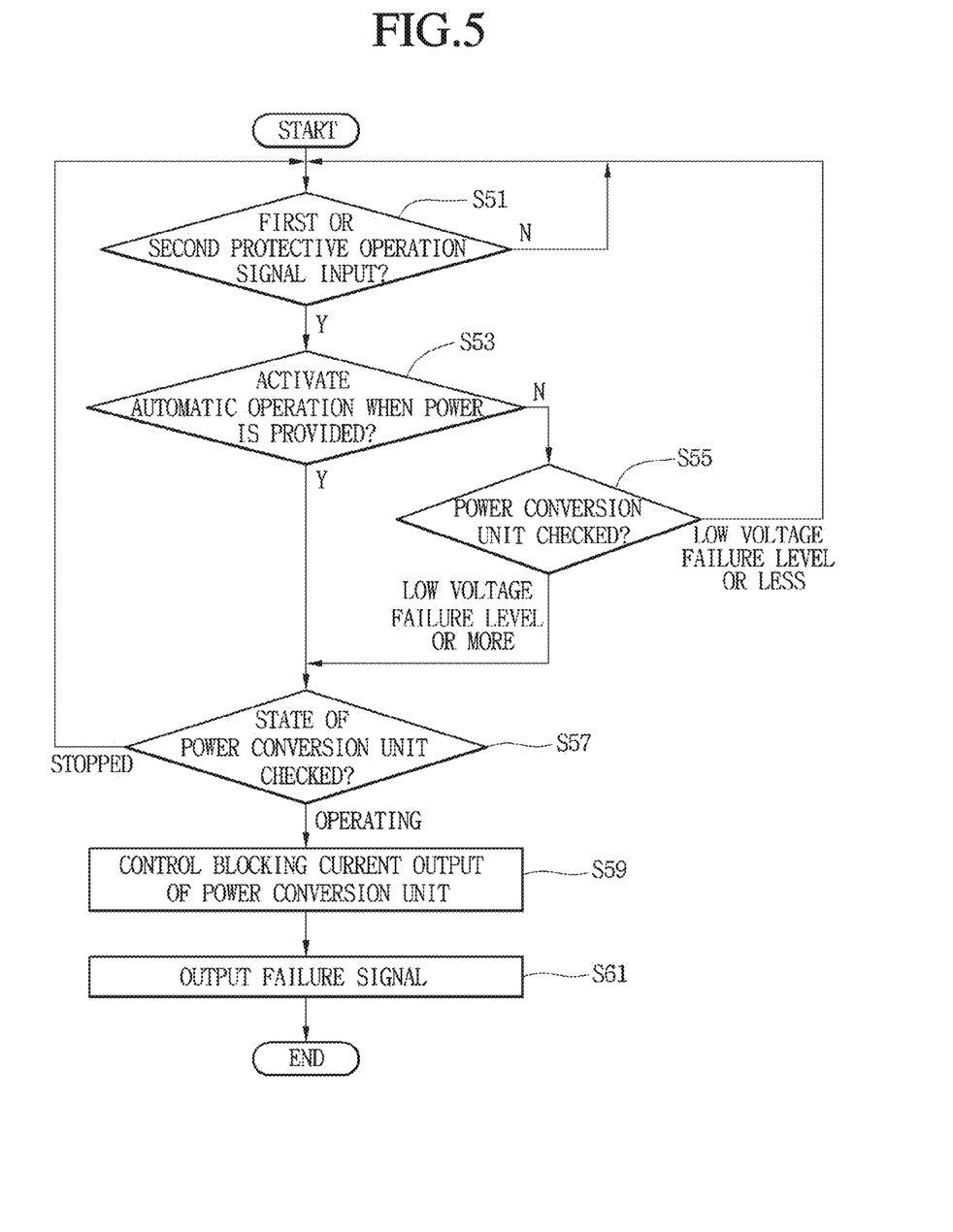
FIG. 5 is a flowchart for describing a method for controlling an inverter according to another embodiment.

FIG. 5 is a flowchart for describing a method for controlling an inverter according to another embodiment. Although the flowchart is provided by the control unit 18 of the inverter 1 in FIG. 1 and represents cases in which the first protective operation signal is inputted from the DC overcurrent protection operation unit 16 in an initial charging state of the inverter 1 or the second protective operation signal is inputted from the output overcurrent protective operation unit 17, the present disclosure is not limited thereto. For example, the control unit 18 may not only receive the first protective operation signal or the second protective operation signal, but also the abnormal signal due to overheating of the electric motor 2, or the abnormal signal due to overloading of the electric motor 2. It will be apparent that an embodiment may also be applied when the abnormal signal due to overloading of the inverter 1 is received.

As illustrated in the drawing, in an initial charging state in which power is provided to the inverter 1 according to an embodiment and alternating current having a predetermined size and frequency is provided to the electric motor 2, when the first protective operation signal is inputted from the DC overcurrent protective operation unit 16 or the second protective operation signal is inputted from the output overcurrent protective operation unit 17 (S51), the control unit 18 according to an embodiment may determine whether an automatic driving function of the inverter 1 is activated while the power is provided, unlike the case in which an output of the power conversion unit 13 according to a related art is instantly blocked and the failure signal is outputted. In the automatic driving case while the power is provided, the operation S57 may be started without determining the DC terminal voltage in operation S55 because the electric motor 2 is capable of operating regardless of the DC terminal voltage.

That is, when the automatic driving is activated while the power is provided, the control unit 18 may check the driving state of the power conversion unit 13 (S57). When the inverter 1 is not operating and is stopped, the power conversion unit 13 of the inverter 1 may not output current to the electric motor 2 and may not generate an abnormal signal such as the protective operation signal due to the overcurrent. Thus, the control unit 18 may determine that the abnormal signal such as the corresponding protective operation signal is generated by a malfunction, and the ensuing failure signal may not be outputted.

When the automatic driving is deactivated while the power is provided in operation S53, the control unit 18 may check the DC terminal voltage of the smoothing unit 12 of the inverter 1 (S55). When the DC terminal voltage is equal to or less than a low voltage failure level, it is impossible to drive the inverter 1, and thus, the power conversion unit 13 is not outputting current to the electric motor 2. Accordingly, when the power conversion unit 13 does not output current to the electric motor 2, because an abnormal signal such as the protective operation signal may be generated only while the electric motor 2 is operating, the control unit 18 may determine that the abnormal signal such as the corresponding protective operation signal is generated due to a malfunction and may not output the failure signal.

When the DC terminal voltage is equal to or greater than the low voltage failure level in operation S55, this indicates that the electric motor 2 is operating. Accordingly, the control unit 18 may check the driving state of the power conversion unit 13 (S57). When the inverter 1 is not operating and is stopped, the power conversion unit 13 of the inverter 1 may not output current to the electric motor 2 and may not generate the abnormal signal such as the protective operation signal due to the overcurrent. Thus, the control unit 18 may determine that the abnormal signal such as the corresponding protective operation signal is generated by a malfunction and may not output the failure signal.

When the inverter is operating in operation S57, because the power conversion unit 13 is outputting current, the control unit 18 may control the power conversion unit 13 according to the abnormal signal such as the inputted protective operation signal to block current output (S59) and output the failure signal (S61).

According to the failure signal of the control unit 18, the display unit 19 in FIG. 4, a display unit of the HMI (not shown), or a display unit of a user's terminal (not shown) may output a message indicating that the operation is being stopped because the inverter has failed, according to the corresponding failure signal.

According to an embodiment, the power conversion unit of the inverter may determine a malfunction that performs the protective operation due to external noise when current is not being output to the electric motor, to increase the reliability of the protective operation of the inverter and enhance user convenience.

Although embodiments have been described above, they are only exemplary, and those skilled in the art will understand that various modifications and other embodiments that fall within the same scope can be derived therefrom. Hence, the real protective scope of the present disclosure shall be determined by the technical scope of the accompanying claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an inverter comprising a rectification unit rectifying input AC power to DC power, a smoothing unit smoothing the DC power, and a power conversion unit converting the smoothed DC power into AC power having a predetermined size and frequency, the method comprising:
   receiving an abnormal signal of either the inverter or an electric motor for driving the inverter;
   determining whether a DC terminal voltage of the smoothing unit is equal to or greater than a low voltage failure level when the abnormal signal is received;
   checking a driving state of the power conversion unit when the DC terminal voltage of the smoothing unit is equal to or greater than the low voltage failure level;
   blocking current output of the power conversion unit when the power conversion unit is driving;
   determining that the abnormal signal is generated due to a malfunction of the inverter when the DC terminal voltage is less than the low voltage failure level or when the power conversion unit is not driving; and
   outputting a failure signal when the power conversion unit is driving only when it is determined that the abnormal signal is not generated due to the malfunction.

2. The method according to claim 1, wherein the abnormal signal indicates either an overcurrent of the smoothing unit, that an output of the power conversion unit is an overcurrent, overheating of the electric motor, an overload of the electric motor or an overload of the inverter.

3. A method of controlling an inverter comprising a rectification unit rectifying input AC power into DC power, a smoothing unit smoothing the DC power, and a power conversion unit converting the smoothed DC power into AC power having a predetermined size and frequency, the method comprising:
   receiving an abnormal signal of either the inverter or an electric motor for driving the inverter;
   determining whether an automatic driving function of the inverter is activated while power is provided to the inverter when the abnormal signal is received;
   checking a driving state of the power conversion unit when the automatic driving function is activated;
   determining whether a DC terminal voltage of the smoothing unit is equal to or greater than a low voltage failure level when the automatic driving function is not activated;
   blocking current output of the power conversion unit when the automatic driving function is activated, the DC terminal voltage is equal to or greater than the low voltage failure level, and the power conversion unit is driving;

determining that the abnormal signal is generated due to a malfunction of the inverter when the DC terminal voltage is less than the low voltage failure level or when the power conversion unit is not driving; and outputting a failure signal when the automatic driving function is activated, the DC terminal voltage is equal to or greater than the low voltage failure level, and the power conversion unit is driving only when it is determined that the abnormal signal is not generated due to the malfunction.

4. The method according to claim 3, wherein the abnormal signal indicates either an overcurrent of the smoothing unit, that an output of the power conversion unit is an overcurrent, overheating of the electric motor, an overload of the electric motor or an overload of the inverter.

* * * * *